(12) United States Patent
Wright et al.

(10) Patent No.: US 11,077,943 B2
(45) Date of Patent: Aug. 3, 2021

(54) ROTARY-WING AIR VEHICLE AND METHOD AND APPARATUS FOR LAUNCH AND RECOVERY THEREOF

(71) Applicant: BAE Systems plc, London (GB)

(72) Inventors: Julian David Wright, Preston (GB); Nicholas Giacomo Robert Colosimo, Preston (GB); Clyde Warsop, Bristol (GB)

(73) Assignee: BAE Systems plc, London (GB)

( * ) Notice: Subject to any disclaimer, the term of this patent is extended or adjusted under 35 U.S.C. 154(b) by 696 days.

(21) Appl. No.: 15/768,201

(22) PCT Filed: Oct. 28, 2016

(86) PCT No.: PCT/GB2016/053345
§ 371 (c)(1),
(2) Date: Apr. 13, 2018

(87) PCT Pub. No.: WO2017/072517
PCT Pub. Date: May 4, 2017

(65) Prior Publication Data
US 2018/0305011 A1 Oct. 25, 2018

(30) Foreign Application Priority Data

Oct. 30, 2015 (EP) ...................... 15275222
Oct. 30, 2015 (GB) ...................... 1519177

(51) Int. Cl.
*B64C 39/02* (2006.01)
*A63H 27/00* (2006.01)
*B64C 29/00* (2006.01)

(52) U.S. Cl.
CPC ........... *B64C 39/024* (2013.01); *A63H 27/00* (2013.01); *B64C 29/00* (2013.01);
(Continued)

(58) Field of Classification Search
CPC ... B64C 39/024; B64C 29/00; B64C 29/0033; B64C 2201/201; B64C 2201/182;
(Continued)

(56) References Cited

U.S. PATENT DOCUMENTS 1,790,309 A   1/1931  Keintz
2,349,858 A   5/1944  Gillmor
(Continued)

FOREIGN PATENT DOCUMENTS

CN     104787315 A    7/2015
CN     204822073 U   12/2015
(Continued)

OTHER PUBLICATIONS

Notice of Allowance for U.S. Appl. No. 15/768,716, dated Aug. 3, 2020, 18 Pages.
(Continued)

*Primary Examiner* — Valentina Xavier
(74) *Attorney, Agent, or Firm* — Maine Cemota & Rardin

(57) ABSTRACT

A rotary-wing air vehicle comprising a main body (12) and at least two rotor devices (16a, 16b) arranged and configured to generate propulsion and thrust, in use, to lift and propel said air vehicle, said rotor devices (16a, 16b) being arranged and configured relative to said main body (12) such that the blades thereof do not cross through a central vertical axis of said main body (12) defining the centre of mass thereof, wherein said main body (12) is provided with an aperture (100) that extends therethrough to define a channel about said central vertical axis.

19 Claims, 6 Drawing Sheets

(52) U.S. Cl.
CPC .... *B64C 29/0033* (2013.01); *B64C 2201/021* (2013.01); *B64C 2201/024* (2013.01); *B64C 2201/088* (2013.01); *B64C 2201/104* (2013.01); *B64C 2201/108* (2013.01); *B64C 2201/182* (2013.01); *B64C 2201/201* (2013.01)

(58) Field of Classification Search
CPC ........ B64C 2201/108; B64C 2201/104; B64C 2201/088; B64C 2201/024; B64C 2201/021; A63H 27/00
See application file for complete search history.

(56) References Cited

U.S. PATENT DOCUMENTS

| | | | |
|---|---|---|---|
| 2,479,125 | A | 8/1949 | Leonard |
| 3,136,501 | A | 6/1964 | Barber |
| 4,123,020 | A | 10/1978 | Korsak |
| 4,522,104 | A | 6/1985 | Degen |
| 5,267,885 | A | 12/1993 | Niskern |
| 5,279,199 | A | 1/1994 | August |
| 5,765,783 | A | 6/1998 | Albion |
| 6,260,796 | B1 | 7/2001 | Klingensmith |
| 6,477,326 | B1 | 11/2002 | Partynski et al. |
| 8,544,788 | B1 * | 10/2013 | Capper .................... B64B 1/28 244/33 |
| 9,085,354 | B1 | 7/2015 | Peeters et al. |
| 2003/0179288 | A1 | 9/2003 | Jones |
| 2003/0185549 | A1 | 10/2003 | Partynski |
| 2008/0105112 | A1 | 5/2008 | Grabmeier |
| 2008/0223994 | A1 * | 9/2008 | Greenley ............... A63H 27/02 244/7 R |
| 2010/0025543 | A1 * | 2/2010 | Kinsey ................... B64C 29/02 244/7 A |
| 2010/0228406 | A1 | 9/2010 | Hamke et al. |
| 2010/0252690 | A1 * | 10/2010 | Hothi ................... B64C 39/024 244/7 B |
| 2012/0248259 | A1 | 10/2012 | Page et al. |
| 2013/0162761 | A1 | 6/2013 | Goldemann |
| 2013/0250047 | A1 | 9/2013 | Hollinger |
| 2014/0008498 | A1 * | 1/2014 | Reiter .................... B64C 29/00 244/7 A |
| 2014/0340427 | A1 | 11/2014 | Baker |
| 2018/0370624 | A1 | 12/2018 | Seale |

FOREIGN PATENT DOCUMENTS

| | | |
|---|---|---|
| DE | 1269497 B | 5/1968 |
| DE | 102006021182 A1 | 11/2007 |
| DE | 102007054126 A1 | 5/2009 |
| EP | 1873058 A2 | 1/2008 |
| FR | 757191 A | 12/1933 |
| FR | 2246444 A1 | 5/1975 |
| FR | 2379430 A2 | 9/1978 |
| FR | 2796454 A1 | 1/2001 |
| GB | 272455 A | 12/1927 |
| GB | 2514582 A | 12/2014 |
| JP | H03292294 A | 12/1991 |
| JP | 2012111475 A | 6/2012 |
| RU | 2072942 | 2/1997 |
| RU | 2330790 C2 | 8/2008 |
| WO | 03063513 A1 | 7/2003 |
| WO | 2008112686 A1 | 9/2008 |
| WO | 2009059173 A1 | 5/2009 |
| WO | 2012029063 A1 | 3/2012 |
| WO | 2012035153 A1 | 3/2012 |
| WO | 2013109742 A1 | 7/2013 |
| WO | 2013120912 A1 | 8/2013 |
| WO | 2014118299 A1 | 8/2014 |
| WO | 2014177591 A1 | 11/2014 |
| WO | 2016109408 A | 7/2016 |
| WO | 2017007915 A1 | 1/2017 |

OTHER PUBLICATIONS

Notice of Allowance for U.S. Appl. No. 15/768,729, dated Jun. 25, 2020, 16 Pages.
International Search Report and Written Opinion of International Application No. PCT/GB2016/053347. dated Jan. 18, 2017, 13 pages.
Search Report under Section 17(5) of Great Britain Application No. GB1519180.2, dated Apr. 27, 2016, 3 pages.
Combined Search and Examination Report under Sections 17 and 18(3) of Great Britain Application No. GB1618228.9, dated Mar. 29, 2017, 7 pages.
Extended European Search Report of European Application No. EP15275224, dated Mar. 24, 2016, 8 pages.
International Search Report and Written Opinion of International Application No. PCT/GB2016/053348, dated Jan. 19, 2017, 18 pages.
Search Report under Section 17(5) of Great Britain Application No. GB1519178.6, dated Apr. 25, 2016, 3 pages.
Combined Search and Examination Report under Sections 17 and 18(3) of Great Britain Application No. GB1618236.2, dated Mar. 30, 2017, 6 pages.
Extended European Search Report of European Application No. EP15275223.4, dated Jun. 6, 2016, 12 pages.
International Search Report and Written Opinion of International Application No. PCT/GB202016053345, dated Jan. 11, 2017, 12 pages.
Search Report under Section 17(5) of Great Britain Application No. GB1519177.8, dated Apr. 25, 2016, 4 pages.
Extended European Search Report of European Application No. EP15275222.6, dated Apr. 27, 2016, 8 pages.
International Search Report and Written Opinion of International Application No. PCT/GB2016/053346, dated Jan. 9, 2017, 15 pages.
Search Report under Section 17(5) of Great Britain Application No. GB1519183.6, dated Apr. 29, 2016, 3 pages.
Combined Search and Examination Report under Sections 17 and 18(3) of Great Britain Application No. GB1618221.4, dated Mar. 23, 2017, 5 pages.
[Squadrone Systems] Hexo+ aerial drone system Kickstarter page, explaining key features, stored bu internet archive on Jul. 26, 2014. Found at http://web.archive.org/web/20140726061306/https://www.kickstarter.com/projects/sqdr/hexo-your-autonomous-aerial-camera Accessed Mar. 3, 2017.
Extended European Search Report of European Application No. EP15275226.7, dated Jul. 4, 2016, 12 pages.
International Search Report and Written Opinion of International Application No. PCT/GB2016/053353, dated Dec. 15, 2016, 11 pages.
Search Report under Section 17(5) of Great Britain Application No. GB1519181.0, dated Apr. 28, 2016, 3 pages.
Extended European Search Report of European Application No. EP15275225.9.
International Preliminary Report on Patentability of International Application No. PCTGB2016053346, dated May 11, 2018, 11 pages.
International Preliminary Report on Patentability of International Application No. PCTGB2016053347, dated May 11, 2018, 9 pages.
International Preliminary Report on Patentability of International Application No. PCTGB2016053348, dated May 11, 2018, 11 pages.
International Preliminary Report on Patentability of International Application No. PCTGB2016053345, dated May 11, 2018, 8 pages.
International Preliminary Report on Patentability of International Application No. PCTGB2016053353, dated May 11, 2018, 8 pages.

* cited by examiner

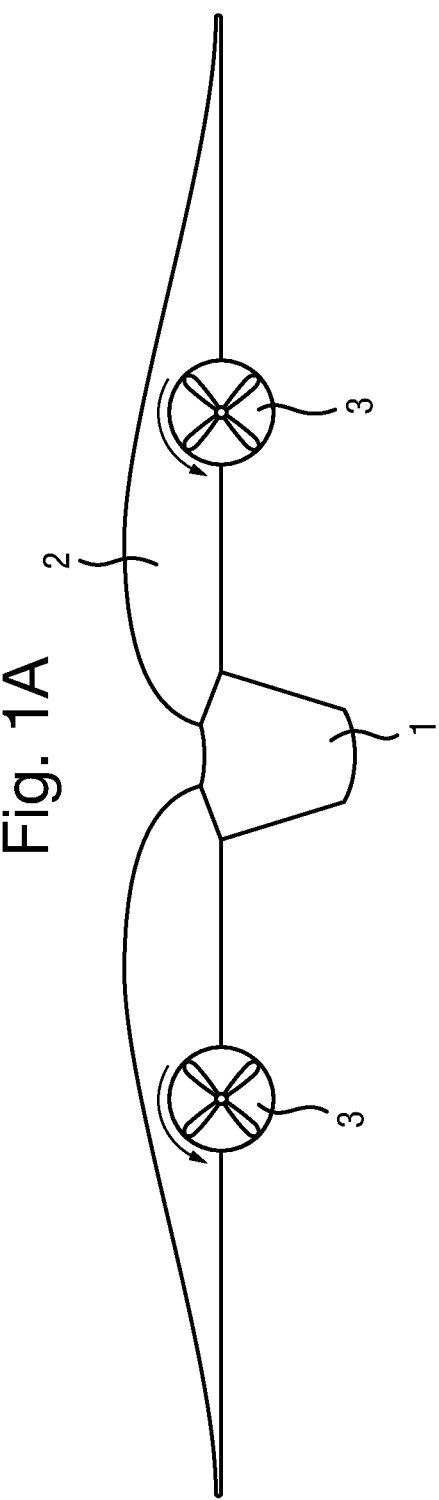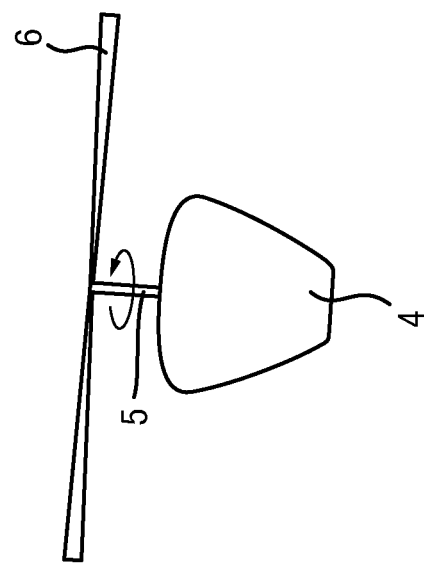

Fig. 4

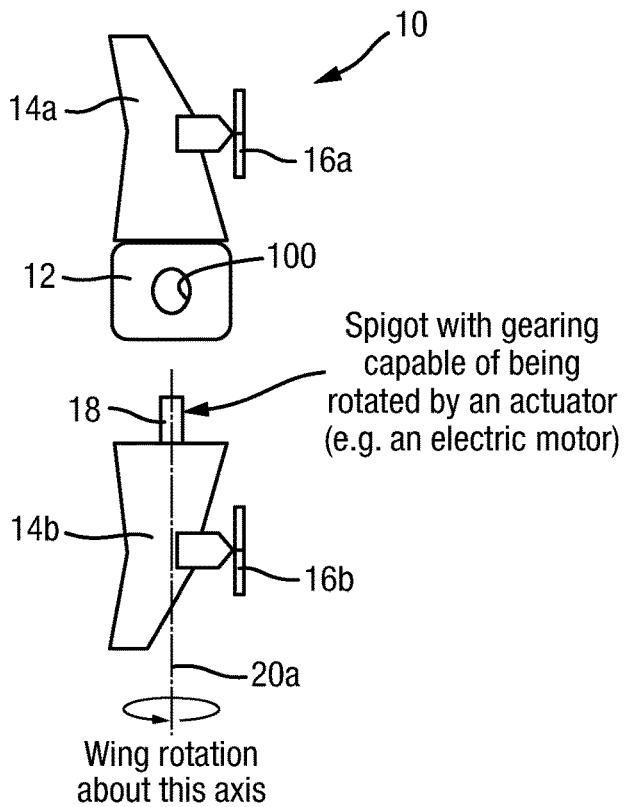

Spigot with gearing capable of being rotated by an actuator (e.g. an electric motor)

Wing rotation about this axis

Fig. 5

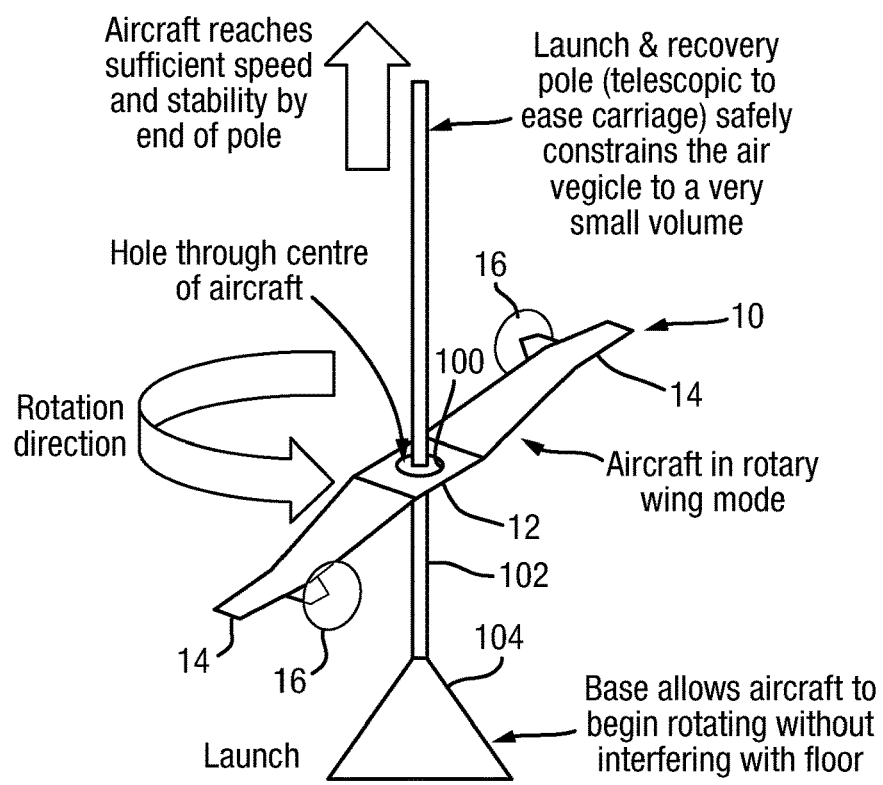

Aircraft reaches sufficient speed and stability by end of pole

Launch & recovery pole (telescopic to ease carriage) safely constrains the air vegicle to a very small volume Hole through centre of aircraft Rotation direction Aircraft in rotary wing mode Launch Base allows aircraft to begin rotating without interfering with floor

ROTARY-WING AIR VEHICLE AND METHOD AND APPARATUS FOR LAUNCH AND RECOVERY THEREOF

RELATED APPLICATIONS

This application is a national phase application filed under 35 USC § 371 of PCT Application No. PCT/GB2016/053345 with an International filing date of Oct. 28, 2016 which claims priority of GB Patent Application 1519177.8 filed Oct. 30, 2015 and EP Patent Application 15275222.6 filed Oct. 30, 2015. Each of these applications is herein incorporated by reference in its entirety for all purposes.

This invention relates generally to a rotary-wing air vehicle and method and apparatus for launch and recovery thereof and, more particularly but not necessarily exclusively, to an unmanned aerial vehicle (UAV) and method and apparatus for launch and recovery thereof.

Unmanned aerial vehicles (UAVs), are well known and used in many different military, as well as civil and commercial, applications, such as search and rescue surveillance, reconnaissance, etc. In general, a UAV is a powered aerial vehicle that does not have a human operator on board, uses aerodynamic forces to provide vehicle lift, and can fly autonomously or be piloted remotely. Although not always a requirement, it is often required for such vehicles to be recoverable and even reusable after a mission.

As with piloted air vehicles, two principal, general types of UAV are known: (i) fixed wing, and (ii) rotary wing.

A fixed wing air vehicle is illustrated schematically in FIG. 1A of the drawings. As shown, a fixed wing air vehicle comprises a main body 1 having a pair of wings 2 extending therefrom, and a respective thrust mechanism 3, such as a propeller or jet, mounted on (or in relation to) each wing. Lift is created by the vehicle's forward airspeed and the shape of the wings 2. The principal advantage of a fixed wing UAV is the speed and endurance that can be achieved, making such UAVs particularly suitable for long-distance and/or persistent missions.

A rotary wing air vehicle is illustrated schematically in FIG. 1B of the drawings. As shown, a rotary wing UAV typically comprises a main body 4 having a generally central mast 5 mounted at its upper end, with rotor blades 6 rotatably mounted on the mast 5. Lift is generated by high speed rotation of the rotor blades 6 around the mast 5. Another type of rotary-wing air vehicle, known as a multicopter, comprises a main body and three or more rotor devices, each rotor device being mounted at or near a distal end of a fixed arm extending substantially horizontally from the main body, and configured to generate lift and propulsion in respect of the main body without the rotor blades of the rotor devices ever crossing through the centre of mass (central vertical axis) of the vehicle. The principal advantage of a rotary wing UAV is that it can take off and land vertically as well as fly forwards, backwards and laterally, and hover, making it particularly suitable for take off and landing where ground space is limited, as well as specific surveillance operations where control is paramount. However, compared with fixed wing air vehicles, rotary winged aircraft have a relatively limited 'endurance'.

There is an ongoing desire to reduce/minimise the ground space required to enable a rotary-wing vehicle to take off and land, particularly in environments where such space is limited. Even though a conventional rotary wing air vehicle is configured to take off and land 'vertically', that is not usually precisely achieved, due, for example, to cross winds and other factors which may affect the vertical stability of the air vehicle and cause it to move laterally before it is safely clear of bystanders and/or infrastructure nearby.

There are also many circumstances in which the speed and endurance capability of a fixed wing UAV, as well as the maneuverability of a rotary wing UAV, may be required, whereas there is currently a clear trade-off between the two distinct types of UAV. It would, therefore, be desirable to provide an air vehicle, such as a UAV, that is able to take off and land from a relatively small ground space, fly forward, backward and laterally, as required, and hover, as well as having the speed and endurance characteristics of a fixed wing air vehicle.

Aspects of the present invention seek to address at least some of these issues and, in accordance with a first aspect of the present invention, there is provided a rotary-wing air vehicle comprising a main body, and at least two rotor devices arranged and configured to generate propulsion and thrust, in use, to lift and propel said air vehicle, said rotor devices being arranged and configured relative to said main body such that the blades thereof do not cross through a central vertical axis of said main body defining the centre of mass thereof, wherein said main body is provided with an aperture that extends therethrough to define a channel about said central vertical axis.

The air vehicle may be a multicopter comprising a three or more rotor devices, each rotor device being mounted at or near a distal end of a fixed arm extending substantially horizontally from said main body.

In another exemplary embodiment of the invention, the air vehicle may comprise a pair of opposing wing members extending substantially laterally from the main body, each said wing member defining a longitudinal axis, at least a first propulsion device associated with a first of said wing members arranged and configured to generate a linear thrust relative to the main body in a first direction, and a second propulsion device associated with a second of said wing members arranged and configured to generate linear thrust relative to said main body in a second, substantially opposite, direction such that said wing members and said main body are caused to rotate, in use.

The propulsion devices may be fixedly coupled to respective wing members, and at least one of said wing members may be rotatably mounted with respect to said body for rotation about an axis orthogonal to the width of the main body when in an upright orientation, between a first position defining a fixed wing flying mode wherein thrust generated by both said propulsion devices acts in the same direction relative to the main body, and a second position defining a rotary wing flying mode wherein thrust generated by said propulsion devices acts in opposite respective directions relative to said main body.

The at least one wing member may be configured to rotate through substantially 180° about said axis between said first and second positions.

The at least one wing member may be mounted to the main body via a coupling member, said coupling member engaging with an actuation device located in or on said main body, wherein operation of said actuation member is effected by said control signal and causes rotation of said at least one wing member via said coupling member.

The above-mentioned channel may be generally conical in configuration, with the diameter thereof increasing from the upper to the lower edge of the main body, when the vehicle is oriented for use.

In accordance with another aspect of the present invention, there is provided apparatus for launch and recovery of an air vehicle substantially as described above, comprising an elongate pole member configured to extend, in use, through said channel defined by said aperture in said main body of said air vehicle.

Thus, the apparatus of the present invention, and the configuration of the air vehicle according to the present invention enables a launch and recovery process to be achieved, whereby the vehicle is horizontally constrained by the pole member during take off and landing, thereby ensuring that it travels only vertically whilst it is at an altitude where it might otherwise pose a threat to nearby people and/or infrastructure.

The pole member may be telescopic and moveable between a fully extended and fully contracted configuration. The apparatus may further comprise a base member on which said pole member is mounted or with which said pole member is formed integrally. In this case, the base member may be configured to support said pole member on a surface. The base member may be mounted on a gimbal mechanism configured to maintain said pole member in an upright position.

Alternatively, the base member may comprise a handle to allow manual manipulation of said pole member relative to an air vehicle, in use.

The base member may comprise or include a container arranged such that a portion of said pole member extends substantially centrally therethrough, and configured to house a plurality of said air vehicles in stacked formation, with each said air vehicle being mounted on said pole member via a respective aperture therein. In this case, the container may have an open upper end, and comprises a closure mechanism for selectively opening and closing said open upper end. The closure mechanism may, for example, comprise an iris type closure mechanism comprising a plurality of leaf members arranged around, and pivotally coupled to, the peripheral edge of said open upper end of said container, and further comprising an actuating mechanism for selectively laterally pivoting said leaf members between an open configuration and a closed configuration.

In accordance with another aspect of the present invention, there is provided a method of launching an air vehicle substantially as described above using apparatus substantially as described above, comprising the steps of providing at least one air vehicle on said pole member adjacent to said base member such that said pole member extends through said aperture, and operating said air vehicle such that it is lifted along said pole member toward its distal end until it is clear of said distal end.

In accordance with yet another aspect of the present invention, there is provided a method of recovery of an air vehicle substantially as described above using apparatus substantially as described above, comprising the steps of aligning the distal end of said pole member with said aperture in said main body of said air vehicle, subsequently, capturing said air vehicle on said pole member by causing said distal end of said pole member to enter said channel, and causing said captured air vehicle to move downwardly along said pole member to a location adjacent to said base member.

The air vehicle may further comprise one or more sensors located in the vicinity of said channel, and said pole member comprises at least one beacon device, and said apparatus may further comprise a guidance control module for monitoring signals emitted by said sensors and said beacon device, determining when said distal end of said pole member is aligned with the aperture of an air vehicle to be recovered, and outputting a control signal indicative thereof to cause said air vehicle to be captured on said pole member.

These and other aspects of the present invention will be apparent from the following specific description in which embodiments of the invention are described, by way of examples only, and with reference to the accompanying drawings, in which:

FIG. 1A is a schematic front view of a fixed wing air vehicle according to the prior art;

FIG. 1B is a schematic front view of a rotary wing air vehicle according to the prior art;

FIG. 4 is a schematic plan view illustrating the manner of connection of a wing to the main body in a hybrid fixed-rotary wing air vehicle according to an exemplary embodiment of the present invention;

FIG. 4A is a schematic diagram illustrating the flight phases of a typical mission undertaken by a hybrid fixed-rotary wing air vehicle according to an exemplary embodiment of the present invention;

FIG. 5 is a schematic front view of a launch and recovery apparatus according to an exemplary embodiment of the present invention, when in use to launch an air vehicle according to an exemplary embodiment of the present invention;

Figure 2:
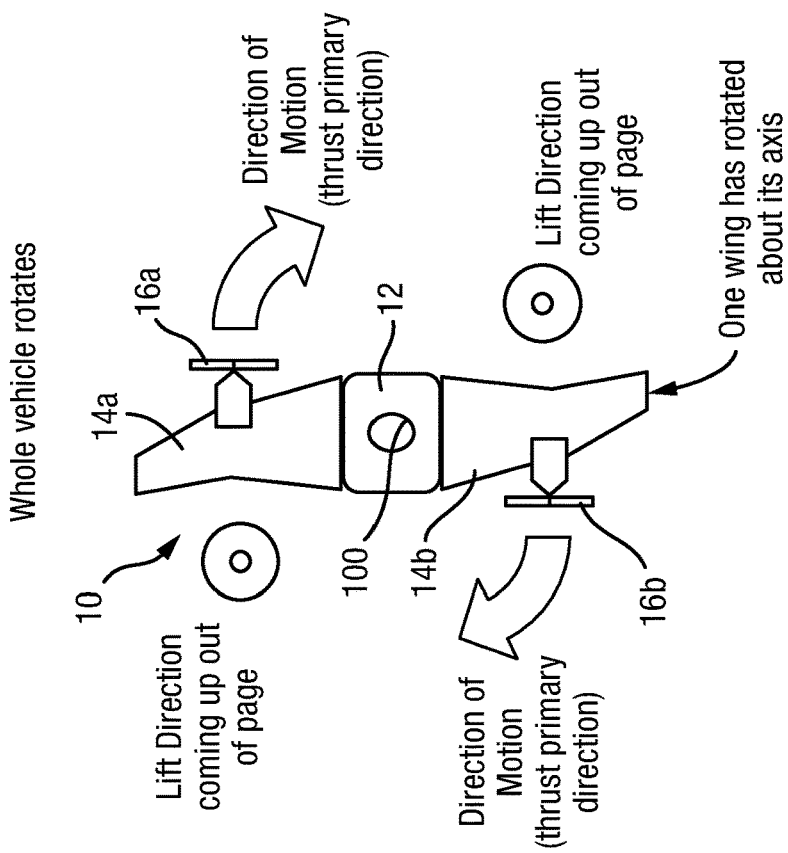
FIG. 2 is a schematic plan view of a hybrid fixed-rotary wing air vehicle according to a first exemplary embodiment of the present invention, illustrated in the fixed wing flying mode configuration.

Referring to FIG. 2 of the drawings, an air vehicle 10 according to a first exemplary embodiment of the present invention comprises a main body 12, on which are mounted two opposing wing members 14a, 14b such that they extend laterally outward from respective opposing sides of the main body 12 to define a wingspan having a longitudinal axis 140. In the example shown, the wings 14a, 14b have a compound swept back configuration, to aid aerodynamic stability and reduce drag, but it will be appreciated that the present invention is in no way intended to be limited with regard to wing configuration. A respective propulsion device 16a, 16b is mounted at the 'leading' edge of each wing 14a, 14b and, in the example shown, the propulsion devices 16a, 16b are facing in the same direction. Thus, when both propulsion devices are operated to generate thrust in the same direction, they cause the vehicle to move forwards. The aerofoil cross-sectional shape of the wings 14a, 14b produces an aerodynamic force as the vehicle moves forward; and the component of this force perpendicular to the direction of motion is called lift, whereas the component parallel to the direction of motion is called drag. "Turning" of the air in the vicinity of the aerofoil creates curved streamlines, resulting in lower pressure on one side and higher pressure on the other. This pressure difference is accompanied by a velocity difference, via Bernoulli's principle, so the resulting flow-field about the aerofoil has a higher average velocity on the upper surface than on the lower surface. The lift force is related directly to the average top/bottom velocity difference.

Figure 3:
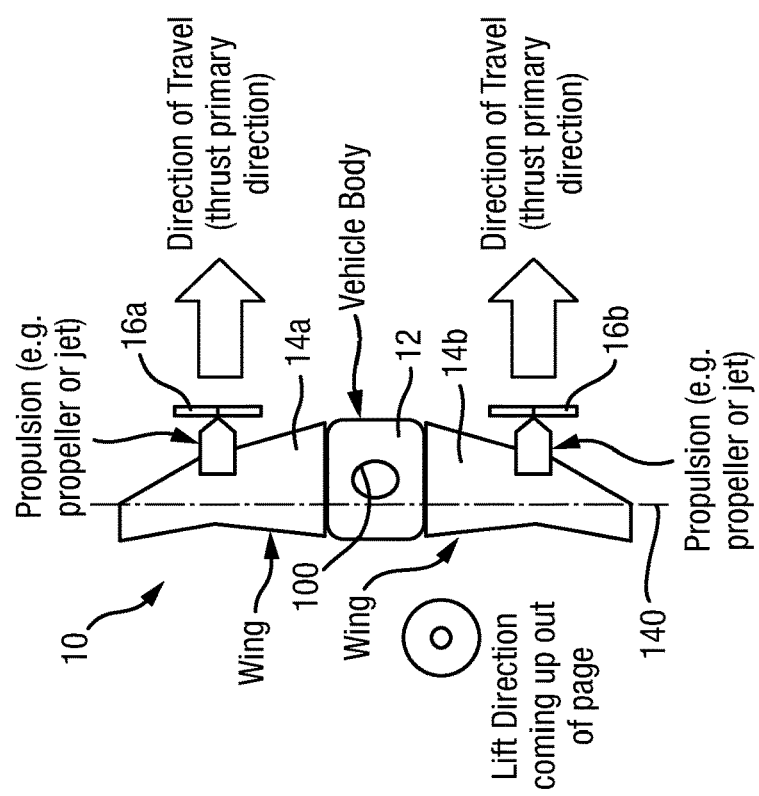
FIG. 3 is a schematic plan view of the hybrid fixed-rotary wing air vehicle of FIG. 2, illustrated in the rotary wing flying mode configuration.

Referring back to FIG. 2 and also to FIG. 4 of the drawings, at least one of the wings 14b is rotatably mounted on the side of the main body 12 by means of a longitudinal shaft 18 extending from the inner end of the wing 14b. Thus, referring to FIG. 3 of the drawings, in the event that it is required to change the mode of flying of the vehicle 10 from fixed wing to rotary wing flying mode, a control signal is generated that causes the wing 14b to rotate about the axis 20 defined by the shaft 18 (which is substantially parallel to the axis 140 defined by the wingspan), such that the leading edge of the wing 14b and the associated propulsion device 16b are facing in the opposite direction. With the thrust from the two propulsion devices 16a, 16b now operating in opposite linear directions, the net result is a rotary force that causes the air vehicle 10 as a whole to spin. Lift is maintained because the spinning wings act as a rotary blade forcing air downwardly to overcome the force of gravity and create vertical lift. However, it is envisaged that the effective aerofoil cross-section of the propeller blades may be dynamically altered according to their relative location within a rotary cycle in order to maintain efficient horizontal movement of the vehicle. In the rotary wing mode, the aircraft can be controlled in a manner similar to a conventional rotary wing air vehicle, to control vertical, horizontal and rotational movement of the vehicle, as required.

Figure 5A:
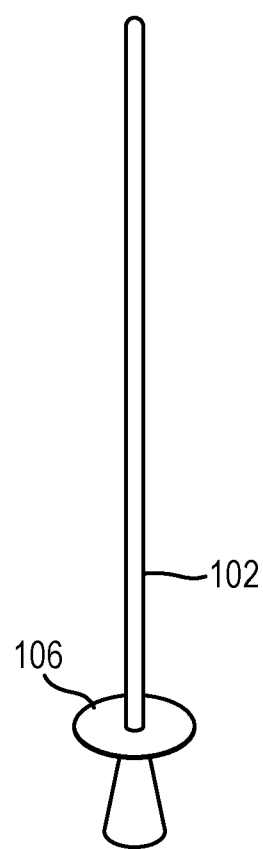
FIG. 5A is a schematic front view of a launch and recovery apparatus according to another exemplary embodiment of the present invention.

It can be seen from FIG. 4 of the drawings, that the air vehicle described above is provided with an aperture 100 generally centrally on, and extending through, the main body 12 which defines a channel having its longitudinal axis substantially orthogonal to the longitudinal axis 20a of the wing members 14a, 14b. Referring additionally to FIG. 5 of the drawings, apparatus for launch and recovery of the air vehicle described above is illustrated schematically, in the form of a pole 102 having some sort of base member 104 to enable the pole 102 to be supported on a surface, such as the deck of a ship or the like. In the example shown, the base member 104 is a three dimensional (e.g. conical or cylindrical) base member that is functional to provide a space between the bottom of the pole 102 and the ground. In some exemplary embodiments, as illustrated in FIG. 5A of the drawings, the base member may comprise a handle or hand grip 106 to allow it to be held and controlled by a person.

In the case where the apparatus may be required to be used on a moving base, such as a ship, the base member 104 may be mounted on a gimbal arrangement. A gimbal is defined as a pivoted support that allows the rotation of an object about a single axis. A set of three gimbals, one mounted on the other with orthogonal pivot axes may be used in this case, wherein the base member carrying the pole 102 is mounted on the innermost gimbal such that it remains independent of the rotation of its support. In other words, the pole 102, when mounted on the gimbaled base member 104, will remain upright (substantially vertical) irrespective of whether the craft or body on or by which it is carried is pitching forward, left, right, etc.

The pole 102 itself may, advantageously be of telescopic configuration, for ease and safety of storage and transportation. In use, to launch the air vehicle, the vehicle 10 (in the rotary wing mode and configuration described above with reference to FIG. 3 of the drawings) is mounted on the pole 102, adjacent to the base member 104 (or handle 106), with the pole 102 extending through the aperture 100 in the centre of the main body 12. The propulsion devices 16a, 16b, which are facing in opposite directions relative to the main body 12, are started such that the vehicle starts to rotate about the pole 102. Once the speed of rotation of the vehicle is sufficient, lift is generated and the air vehicle 10 will start to rise, still spinning about the pole 102. Any instability in the vehicle rotation during this process is compensated by the pole 102 which prevents the vehicle from being deflected or diverted out of the very small launch volume, the radius of which is defined by the distance between the centre of the aperture 100 and the distal end of each wing member 14a, 14b.

The pole 102 is of sufficient length, by design, to ensure that the air vehicle has reached a sufficient speed and level of stability by the time it reaches the top and is lifted clear of the distal end of the pole 102 to independently effect substantially stable flight. At this point, the air vehicle can be controlled (remotely or automatically) to move horizontally away from the top of the pole 102 and, if required, then transformed from the rotary wing flying mode to the fixed wing flying mode (described above with reference to FIG. 2 of the drawings) by rotation of the wing member 14b, such that the propulsion devices are both located on the leading edge of respective wing members 14a, 14b and generating thrust in the same direction relative to the main body 12 of the air vehicle.

Figure 6:
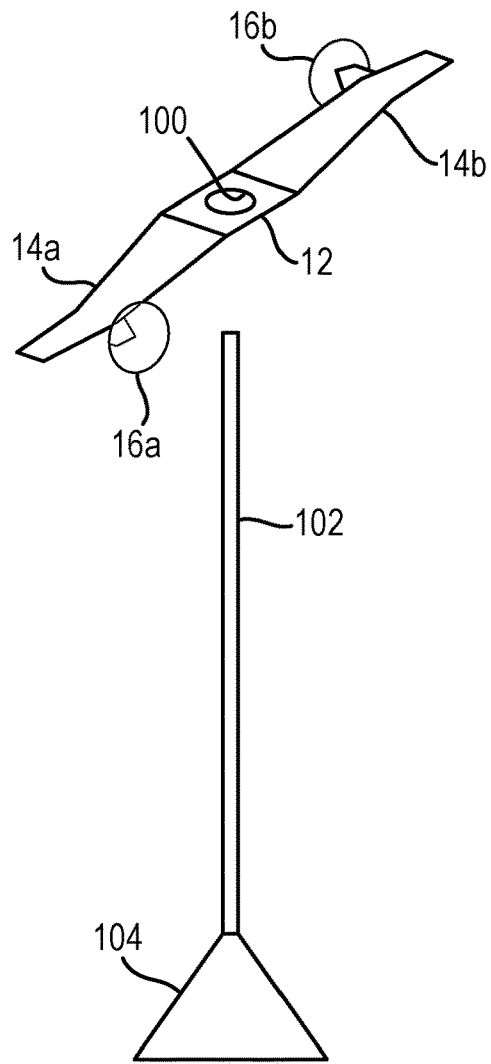
FIG. 6 is a schematic front view of the apparatus of FIG. 5, when in use to recover an air vehicle according to an exemplary embodiment of the present invention.
Figure 6A:
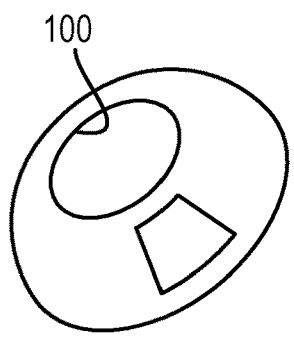
FIG. 6A is a schematic bottom perspective view of the aperture and channel defined through the main body of an air vehicle according to an exemplary embodiment of the present invention.

Referring to FIG. 6 of the drawings, when a flight is complete, and it is required to recover the air vehicle, its flying mode is again changed to the rotary-wing flying mode described above with reference to FIG. 3 of the drawings, by rotating one of the wing members 14b (or otherwise changing the direction of thrust of one of the propulsion devices relative to the main body), such that the whole air vehicle starts to spin. It can then commence its descent back toward the pole 102 of the above-described apparatus (or a similar apparatus). In this case, it is envisaged that sensors (not shown) may be provided on the air vehicle, possibly in the vicinity of the aperture 100, that cooperate with, for example, a beacon or similar device located at the distal end of the pole 102 to cause a reference or guidance signal to be generated that is configured to guide the air vehicle onto the pole such that the pole 102 enters the aperture 100. In one exemplary embodiment, guidance control signals may be generated by a plurality of sensors (not shown) located in spaced-apart relation around the lower periphery of the aperture 100, and the above-mentioned beacon on the distal end of the pole 102 may generate a signal of similar configuration. Thus, in one exemplary embodiment of the invention, a guidance control system may be configured to monitor a phase difference between the sensor and beacon signals to generate the above-mentioned reference or guidance signal, and determine when the phase of all of the guidance control signals matches that of the beacon signal, thereby indicating that the air vehicle is correctly located above the pole 102 for effective recovery thereof.

In another exemplary embodiment, wherein a handle or hand grip 106 is provided at the proximal end of the pole 102 (as shown in FIG. 5A of the drawings), an operator may hold and manually control the pole 102 thereby, in order to "spear" or capture the air vehicle 10, via the aperture 100, onto the pole 102.

The inner configuration of the aperture 100 through the main body 12 may be generally conical so as to aid capture of the air vehicle during the recovery process. Once the pole tip (and, optionally, a sufficient length of the pole 102) has passed through the aperture 100 in the main body 12, the propulsion devices 16a, 16b can be automatically switched off to allow the vehicle to progressively slow down and stop spinning and thus slide down the remaining length of the pole 102 until it comes to rest at the top of the base member 104.

Thus, aspects of the present invention provides an air vehicle concept which is capable of being launched and recovered vertically within a very small volume, hovering flight, and the ability to transition to fixed wing flight, thereby achieving the increased speed and endurance characteristics associated therewith.

Figure 7:
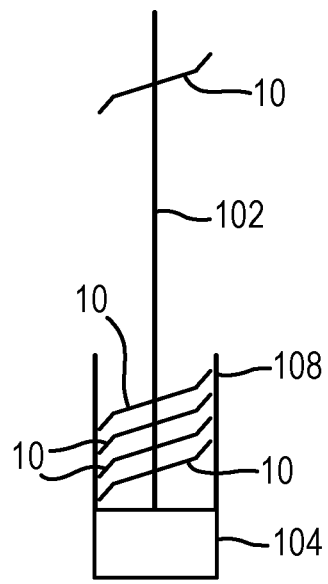
FIG. 7 is a schematic front view of a launch and recovery apparatus according to another exemplary embodiment of the present invention.
Figure 7A:
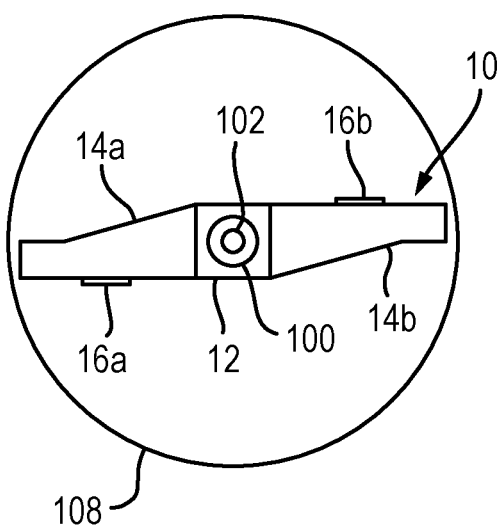
FIG. 7A is a schematic plan view of the launch and recovery apparatus of FIG. 7, when the canister is open.
Figure 7B:
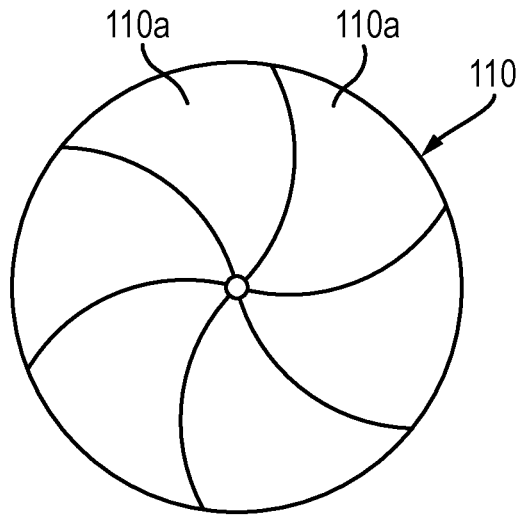
FIG. 7B is a schematic plan view of the launch and recovery apparatus of FIG. 7, when the canister is closed.

In another exemplary embodiment of the invention, as illustrated schematically in FIGS. 7, 7A and 7B of the drawings, the base member 104 may have a canister 108 mounted thereon (or formed integrally therewith), in which is housed a plurality of stacked air vehicles 10 of the type described above. Each of the stacked air vehicles 10 is housed and aligned with the canister 108, and mounted on the pole 102 such that the pole 102 extends through the aperture 100 of each of the stacked air vehicles 10. The canister 108 may be provided with a closure mechanism 110 which is configured to selectively open and close the canister laterally (so as to avoid obstructing the vertical path of the air vehicles up the pole 102). Such a closure mechanism 110 may comprise an "iris" type mechanism comprising a plurality of 'leaves' 110a arranged in overlapping configuration about the periphery of the open end of the canister 108, and individually pivotally coupled thereto. Each of the leaves 110a is substantially identical in size and shape and configured, in the closed configuration, to extend partially over the open end of the canister 108, with the net effect of all of the leaves 110a being that they cover the open end of the canister 108, leaving a central opening 110b to accommodate the pole 102. Each of the pivotally-coupled leaves 110a is communicably coupled to an actuating mechanism (not shown) which, when in use, causes each of the leaves 110a to pivot about its pivotal axis (substantially laterally relative to the open end of the canister 108), toward the inner peripheral wall of the canister 108, so as to expose the open end thereof and allow the air vehicles 10 therein to move, unobstructed, upwardly along the length of the pole 102.

Thus, when the canister 108 is in the open configuration, each of the air vehicles can be launched in turn, in the manner described above, starting with the air vehicle at the top of the stack, nearest to the open end of the canister 108. During recovery, each of the air vehicles 10 can, in turn, be recovered in the manner described above, becoming 'stacked' within the canister 108 once again. Once all of the vehicles have been recovered as required, the closure mechanism described above is used to seal the open end of the canister 108 to protect the air vehicles housed therein, until required once again for use.

It will be appreciated by a person skilled in the art, from the foregoing description, that modifications and variations can be made to the described embodiments, without departing from the scope of the invention as defined by the appended claims. For example, the principles described above may be applied to a multi-copter vehicle comprising a plurality of rotor devices, whereby each rotor device is mounted at or near a distal end of a fixed arm extending substantially horizontally from the main body. The central aperture can be provided through the main body of this type of vehicle and the launch and recovery method and apparatus described above can be used because, in this type of device, the rotor blades do not pass through the centre of mass of the vehicle such that they will not interfere with the pole as the vehicle moves up or down along it.

The invention claimed is:

1. A rotary-wing air vehicle comprising a main body, and at least two rotor devices arranged and configured to generate propulsion and thrust, in use, to lift and propel said air vehicle, said rotor devices being arranged and configured relative to said main body such that the blades thereof do not cross through a central vertical axis of said main body defining the centre of mass thereof, wherein said main body is provided with an aperture that extends there through to define a channel about said central vertical axis, wherein, in use, the aperture is arranged to receive an elongated pole member; and a pair of opposing wing members extending substantially laterally from the main body, each said wing member defining a longitudinal axis, at least a first propulsion device associated with a first of said wing members arranged and configured to generate a linear thrust relative to the main body in a first direction, and a second propulsion device associated with a second of said wing members arranged and configured to generate linear thrust relative to said main body in a second, substantially opposite, direction such that said wing members and said main body are caused to rotate, in use.

2. The air vehicle according to claim 1, wherein said air vehicle is a multi-copter comprising a three or more rotor devices, each rotor device being mounted at or near a distal end of a fixed arm extending substantially horizontally from said main body.

3. The air vehicle according to claim 1, wherein said propulsion devices are fixedly coupled to respective wing members, and at least one of said wing members is rotatably mounted with respect to said body for rotation about an axis orthogonal to the width of the main body when in an upright orientation, between a first position defining a fixed flying mode wherein thrust generated by both said propulsion devices acts in the same direction relative to the main body, and a second position defining a rotary wing flying mode wherein thrust generated by said propulsion devices acts in opposite respective directions relative to said main body.

4. The air vehicle according to claim 3, wherein said at least one wing member is configured to rotate through substantially 180° about said axis between said first and second positions.

5. The air vehicle according to claim 3, wherein the at least one wing member is mounted to the main body via a coupling member, said coupling member engaging with an actuation device located in or on said main body, wherein operation of said actuation member is effected by said control signal and causes rotation of said at least one wing member via said coupling member.

6. The air vehicle according to claim 1, wherein said channel is generally conical in configuration, with the diameter thereof increasing from the upper to the lower edge of the main body, when the vehicle is oriented for use.

7. Apparatus for launch and recovery of an air vehicle according to claim 1, comprising an elongated pole member configured to extend, in use, through said channel defined by said aperture in said main body of said air vehicle.

8. The apparatus according to claim 7, further comprising a base member on which said pole member is mounted or with which said pole member is formed integrally.

9. The apparatus according to claim 8, wherein said base member comprises or includes a container arranged such that a portion of said pole member extends substantially centrally therethrough, and configured to house a plurality of said air vehicles in stacked formation, with each said air vehicle being mounted on said pole member via a respective aperture therein.

10. The apparatus according to claim 9, wherein said container has an open upper end, and comprises a closure mechanism for selectively opening and closing said open upper end.

11. The apparatus according to claim 10, wherein said closure mechanism comprises an iris type closure mechanism comprising a plurality of leaf members arranged around, and pivotally coupled to, the peripheral edge of said open upper end of said container, and further comprising an actuating mechanism for selectively laterally pivoting said leaf members between an open configuration and a closed configuration.

12. A method of launching an air vehicle according to claim 1, launched using apparatus comprising the steps of providing at least one air vehicle on said pole member adjacent to said base member such that said pole member extends through said aperture, and operating said air vehicle such that it is lifted along said pole member toward its distal end until it is clear of said distal end.

13. A method of recovery of an air vehicle according to claim 1, recovered using apparatus comprising the steps of aligning the distal end of said pole member with said aperture in said main body of said air vehicle, subsequently, capturing said air vehicle on said pole member by causing said distal end of said pole member to enter said channel, and causing said captured air vehicle to move downwardly along said pole member to a location adjacent to said base member.

14. The method according to claim 13, wherein said air vehicle further comprises one or more sensors located in the vicinity of said channel, and said pole member comprises at least one beacon device, said apparatus further comprising a guidance control module for monitoring signals emitted by said sensors and said beacon device, determining when said distal end of said pole member is aligned with the aperture of an air vehicle to be recovered, and outputting a control signal indicative thereof to cause said air vehicle to be captured on said pole member.

15. The air vehicle according to claim 4, wherein the at least one wing member is mounted to the main body via a coupling member, said coupling member engaging with an actuation device located in or on said main body, wherein operation of said actuation member is effected by said control signal and causes rotation of said at least one wing member via said coupling member.

16. The apparatus for launch and recovery of an air vehicle according to claim 1, comprising an elongate pole member configured to extend, in use, through said channel defined by said aperture in said main body of said air vehicle.

17. A method of launching an air vehicle according to claim 1, launched and recovered with an apparatus having an elongated pole member configured to extend, in use, through said channel defined by said aperture in said main body of said air vehicle, comprising the steps of providing at least one air vehicle on said pole member adjacent to said base member such that said pole member extends through said aperture, and operating said air vehicle such that it is lifted along said pole member toward its distal end until it is clear of said distal end.

18. A method of recovery of an air vehicle according to claim 1, launched and recovered with an apparatus having an elongated pole member configured to extend, in use, through said channel defined by said aperture in said main body of said air vehicle, comprising the steps of aligning the distal end of said pole member with said aperture in said main body of said air vehicle, subsequently, capturing said air vehicle on said pole member by causing said distal end of said pole member to enter said channel, and causing said captured air vehicle to move downwardly along said pole member to a location adjacent to said base member.

19. A method according to claim 18, wherein said air vehicle further comprises one or more sensors located in the vicinity of said channel, and said pole member comprises at least one beacon device, said apparatus further comprising a guidance control module for monitoring signals emitted by said sensors and said beacon device, determining when said distal end of said pole member is aligned with the aperture of an air vehicle to be recovered, and outputting a control signal indicative thereof to cause said air vehicle to be captured on said pole member.

* * * * *